United States Patent
Nam et al.

(10) Patent No.: US 10,438,716 B2
(45) Date of Patent: Oct. 8, 2019

(54) INSULATION COMPOSITION HAVING LOW DIELECTRIC CONSTANT, AND CABLE INCLUDING INSULATION LAYER FORMED THEREFROM

(71) Applicant: LS CABLE & SYSTEM LTD., Anyang-si, Gyeonggi-do (KR)

(72) Inventors: Jin Ho Nam, Seoul (KR); Won Suck Lee, Uiwang-si (KR); Ik Hyun Ryu, Anyang-si (KR); Yi Seul Yang, Anyang-si (KR); Hyun Jung Jung, Seoul (KR); Tae Hyun Lee, Bucheon-si (KR)

(73) Assignee: LS CABLE & SYSTEM LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/084,777

(22) PCT Filed: Feb. 27, 2017

(86) PCT No.: PCT/KR2017/002142
§ 371 (c)(1),
(2) Date: Sep. 13, 2018

(87) PCT Pub. No.: WO2017/160009
PCT Pub. Date: Sep. 21, 2017

(65) Prior Publication Data
US 2019/0080816 A1    Mar. 14, 2019

(30) Foreign Application Priority Data

Mar. 15, 2016  (KR) .................. 10-2016-0031169

(51) Int. Cl.
*H01B 1/22*   (2006.01)
*H01B 1/24*   (2006.01)
(Continued)

(52) U.S. Cl.
CPC ............. *H01B 1/22* (2013.01); *H01B 1/24* (2013.01); *H01B 3/30* (2013.01); *H01B 7/02* (2013.01); *H01B 7/17* (2013.01); *H01B 9/02* (2013.01)

(58) Field of Classification Search
USPC ....................................... 174/110 R
See application file for complete search history.

(56) References Cited

U.S. PATENT DOCUMENTS 3,206,542 A * 9/1965 Dawson ................. B32B 25/00
                                                174/120 R
3,405,204 A * 10/1968 McCormack .......... B05D 3/046
                                                264/83

(Continued)

FOREIGN PATENT DOCUMENTS

KR   1020110035536 A   4/2011
KR    101259746 B1    4/2013
(Continued)

OTHER PUBLICATIONS

International Search Report for related International Application No. PCT/KR2017/002142; dated May 29, 2017;(3 pages).

(Continued)

*Primary Examiner* — William H. Mayo, III
*Assistant Examiner* — Krystal Robinson
(74) *Attorney, Agent, or Firm* — K&L Gates LLP

(57) ABSTRACT

Provided is an insulation composition having a low dielectric constant and a cable including an insulation layer formed of the insulation composition. More particularly, the present invention relates to an insulation composition for reducing a space charge to increase superimposed impulse breakdown strength when impulse voltages overlap during application of a direct-current (DC) voltage, having a low dielectric constant, and improving impulse breakdown (Continued)

strength, and a cable including an insulation layer formed of the insulation composition.

9 Claims, 2 Drawing Sheets

(51) Int. Cl.
*H01B 3/30* (2006.01)
*H01B 7/02* (2006.01)
*H01B 7/17* (2006.01)
*H01B 9/02* (2006.01)

(56) References Cited

U.S. PATENT DOCUMENTS

| | | | | |
|---|---|---|---|---|
| 3,840,694 | A * | 10/1974 | Luczak | H01B 3/308 |
| | | | | 174/120 SR |
| 3,971,882 | A * | 7/1976 | Alia | C08K 3/22 |
| | | | | 174/110 SR |
| 4,020,214 | A * | 4/1977 | MacKenzie, Jr. | C08K 5/057 |
| | | | | 428/389 |
| 4,029,830 | A * | 6/1977 | Yamamoto | H01B 7/0275 |
| | | | | 427/487 |
| 4,151,366 | A * | 4/1979 | Betts | H01B 7/295 |
| | | | | 174/110 B |
| 4,458,103 | A * | 7/1984 | Irie | H02G 1/145 |
| | | | | 174/73.1 |
| 4,536,327 | A * | 8/1985 | Ramisse | H01B 1/24 |
| | | | | 252/511 |
| 4,665,281 | A * | 5/1987 | Kamis | H01B 7/0208 |
| | | | | 174/102 P |
| 4,689,443 | A * | 8/1987 | Bailleul | H01B 7/16 |
| | | | | 174/102 P |
| 6,403,890 | B1 * | 6/2002 | McGregor | H01B 3/305 |
| | | | | 174/120 R |
| 9,536,634 | B2 * | 1/2017 | Choi | H01B 3/18 |
| 9,899,128 | B1 * | 2/2018 | Boyer | H01B 11/1058 |
| 2004/0079547 | A1 * | 4/2004 | Rodway | C08K 3/22 |
| | | | | 174/110 PM |
| 2008/0170982 | A1 * | 7/2008 | Zhang | B82Y 10/00 |
| | | | | 423/447.3 |
| 2009/0059998 | A1 * | 3/2009 | Hou | G01K 3/06 |
| | | | | 374/185 |
| 2012/0000694 | A1 * | 1/2012 | Kim | H01B 3/441 |
| | | | | 174/110 SR |

FOREIGN PATENT DOCUMENTS

| | | |
|---|---|---|
| KR | 101318481 B1 | 10/2013 |
| KR | 101408923 B1 | 6/2014 |
| KR | 1020150101642 A | 9/2015 |

OTHER PUBLICATIONS

Written Opinion for related International Application No. PCT/KR2017/002142; dated May 29, 2017;(7 pages).

* cited by examiner

INSULATION COMPOSITION HAVING LOW DIELECTRIC CONSTANT, AND CABLE INCLUDING INSULATION LAYER FORMED THEREFROM

CROSS-REFERENCE TO RELATED APPLICATIONS

The present application is a National Stage of International Application No. PCT/KR2017/002142, filed Feb. 27, 2017, which claims priority to Korean Application No. 10-2016-0031169, filed Mar. 15, 2016, the disclosures of which are incorporated herein by reference.

TECHNICAL FIELD

The present invention relates to an insulation composition having a low dielectric constant and a cable including an insulation layer formed of the insulation composition. More particularly, the present invention relates to an insulation composition for reducing a space charge to increase superimposed impulse breakdown strength when impulse voltages overlap during application of a direct-current (DC) voltage, having a low dielectric constant, and improving impulse breakdown strength, and a cable including an insulation layer formed of the insulation composition.

BACKGROUND ART

When a high direct-current (DC) voltage is applied to a power cable according to the related art, a charge is injected from a conductor to an insulation layer or is easily formed in the insulation layer due to the influence of a cross linked byproduct of the insulation layer.

Space charges accumulated in the insulation layer distort an electric field of the cable and thus electric stress increases. Accordingly, the intensity of an electric field near the conductor increases and thus superimposed impulse breakdown strength decreases when impulse voltages overlap during application of DC voltage to the cable.

Conventionally, there has been disclosed a technique for reducing a space charge in an insulation layer of a power cable by trapping the space charge by adding inorganic particles to the insulation layer. However, the inorganic particles have a higher dielectric constant than that of polymer resin used to form the insulation layer. Accordingly, when the inorganic particles are added to the polymer resin of the insulation layer, a total dielectric constant of the insulation layer increases and thus impulse breakdown strength of the insulation layer decreases.

Accordingly, an insulation composition for increasing the lifespan of a cable by not only reducing a space charge in an insulation layer to improve superimposed impulse breakdown strength but also reducing a total dielectric constant to improve impulse breakdown strength of the insulation layer, and a cable including an insulation layer formed of the insulation composition are in urgent demand.

DETAILED DESCRIPTION OF THE INVENTION

Technical Problem

The present invention is directed to providing an insulation composition for increasing the lifespan of a cable by improving superimposed impulse breakdown strength by reducing a space charge, and a cable including an insulation layer formed of the insulation composition.

The present invention is also directed to providing an insulation composition for increasing the lifespan of a cable by not only reducing a dielectric constant, but also improving impulse breakdown strength, and a cable including an insulation layer formed of the insulation composition.

Technical Solution

According to an aspect of the present invention, there is provided an insulation composition comprising: a base resin; and inorganic nanoparticles included in the base resin, wherein a dielectric constant of the insulation composition is less than that of the base resin.

According to another aspect of the present invention, there is provided the insulation composition, wherein a dielectric constant reduction rate (%) defined by Equation 1 below is 1% or more, $$\text{dielectric constant reduction (\%)} = [(a-b)/a]*100, \quad \text{[Equation 1]}$$

wherein a represents the dielectric constant of the base resin, and b represents the dielectric constant of the insulation composition.

According to other aspect of the present invention, there is provided the insulation composition, wherein the dielectric constant reduction rate (%) is 2% or more.

According to other of the present invention, there is provided the insulation composition, wherein an electric field distortion factor (%) defined by Equation 2 below is less than 150%, $$\text{electric field distortion factor (\%)} = \alpha/\beta, \quad \text{[Equation 2]}$$

wherein $\alpha$ represents an electric field (kV/mm) applied to an insulation layer sample formed of the insulation composition, and $\beta$ represents an electric field (kV/mm) distorted due to a distribution of space charges in the insulation composition.

According to other of the present invention, there is provided the insulation composition, wherein the electric field distortion factor (%) is 120% or less.

According to other of the present invention, there is provided the insulation composition, wherein a content of the inorganic nanoparticles is 0.01% by weight or more and less than 1% by weight, based on a total weight of the insulation composition.

According to other of the present invention, there is provided the insulation composition, wherein the content of the inorganic nanoparticles is 0.01% by weight or more and less than 1% by weight when the inorganic nanoparticles are metal or non-metal oxide or when the inorganic nanoparticles are carbon-based inorganic particles.

According to other of the present invention, there is provided the insulation composition, wherein the metal or the non-metal oxide comprises at least one selected from the group consisting of magnesium oxide (MgO), zinc oxide (ZnO), silicon oxide ($SiO_2$), aluminum oxide ($Al_2O_3$) and titanium oxide ($TiO_2$), and the carbon-based inorganic particles comprise at least one selected from the group consisting of carbon black, carbon nanotubes, graphene, and silicon carbide (SiC).

According to other of the present invention, there is provided the insulation composition, wherein the inorganic nanoparticles have a size of 1 to 100 nm and a cubic shape.

According to other of the present invention, there is provided the insulation composition, wherein the inorganic nanoparticles are surface modified to be hydrophobic.

According to other of the present invention, there is provided the insulation composition, wherein the base resin is an olefin homopolymer or copolymer resin.

According to other of the present invention, there is provided the insulation composition, further comprising 0.5 to 2% by weight of a crosslinking agent, 0.1 to 1% by weight of an antioxidant, and 0.1 to 1% eight of a scorch inhibitor, based on a total weight the insulating composition.

According to other of the present invention, there is provided a cable comprising: a conductor; an inner semiconducting layer covering the conductor; an insulation layer covering the inner semiconducting layer, and formed of the insulation composition; an outer semiconducting layer covering the insulation layer; and a sheath layer covering the outer semiconducting layer.

Advantageous Effects

An insulation composition according to the present invention contains a specific amount of specific inorganic particles to reduce a space charge, and thus, superimposed impulse breakdown strength of an insulation layer formed of the insulation composition may be improved, thereby increasing the lifespan of a cable.

In addition, a size of the inorganic particles contained in the insulation composition according to the present invention can be controlled to a nanoscale size, so that a dielectric constant of an insulation layer formed of the insulation composition may be reduced and impulse breakdown strength of the insulation layer may be improved, thereby increasing the lifespan of the cable.

MODE OF THE INVENTION

Figure 1:
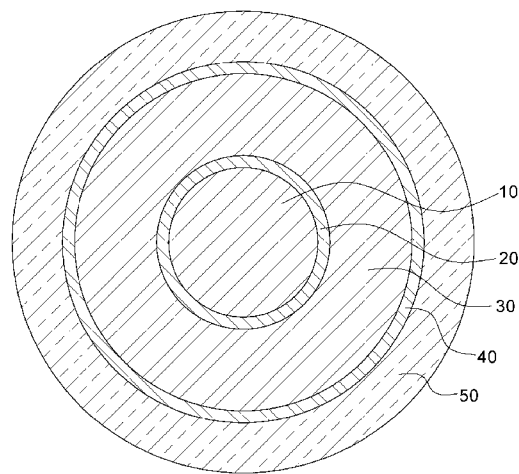
FIG. 1 is a diagram schematically illustrating a cross section of a cable according to the present invention.

Hereinafter, exemplary embodiments of the present invention will be described in detail. The present invention is, however, not limited thereto and may be embodied in many different forms. Rather, the embodiments set forth herein are provided so that this disclosure will be thorough and complete, and fully convey the scope of the invention to those skilled in the art. Throughout the specification, the same reference numbers represent the same elements.

The present invention relates to an insulation composition having a low dielectric constant. The insulation composition having the low dielectric constant according to the present invention may contain a base resin, and inorganic nanoparticles added to and dispersed in the base resin.

The base resin is not particularly limited, and may include, for example, olefin homopolymer or copolymer resins, and particularly, polyolefin resins such as polyethylene polypropene, α-olefin block or random copolymer resins different from ethylene or propylene, thermoplastic elastomer, or the like.

The inorganic nanoparticles added and dispersed in the base resin may include metal or non-metal oxide, such as a magnesium oxide (MgO), zinc oxide (ZnO), silicon oxide ($SiO_2$), aluminum oxide ($Al_2O_3$), or titanium oxide ($TiO_2$), or carbon-based inorganic particles, such as carbon black, carbon nanotubes, graphene, and silicon carbide (SiC).

When the inorganic nanoparticles are added into the base resin, a space charge injected into an insulation layer from a conductor of a cable or generated from cross-linked byproducts of the insulation layer is trapped and thus the intensity of an electric field near the conductor may be increased due to the space charge, thereby suppressing a decrease in superimposed impulse breakdown strength of the insulation layer.

Generally, a dielectric constant of the inorganic nanoparticles is greater than that of the base resin. For example, a dielectric constant of magnesium oxide used as the inorganic nanoparticles is about 10, whereas a dielectric constant of low-density polyethylene (LDPE) used as the base resin is about 2.2 to 2.3. Thus, a dielectric constant of the insulation composition prepared by adding the inorganic nanoparticles to the base resin should be greater than that of the base resin.

However, the inventors of the present application experimentally revealed a fact that a dielectric constant of an insulation composition was lower than that of base resin and an impulse dielectric breakdown voltage increased when inorganic nanoparticles having a nanosize, e.g., a size of 1 nm to 100 μm, or preferably, a size of 1 to 100 nm, were added, unlike when microscale inorganic particles were added, and completed the present invention on the basis of the fact.

The reason why the dielectric constant of the insulation composition was lower than that of the base resin when the inorganic nanoparticles have a nanosize has yet to be revealed but is considered not only due to the so-called nano-effect but also interface stabilization of the inside of the base resin, caused by controlling the size of the inorganic nanoparticles to a nanosize.

That is, the dielectric constant of the insulation composition including the inorganic nanoparticles is reduced and an impulse dielectric breakdown voltage of the insulation layer formed of the insulation composition is increased by controlling the size of the inorganic nanoparticles to a nanosize and thereby the lifespan of the cable including the insulation layer may be increased.

Accordingly, a dielectric constant reduction rate (%) of the insulation composition, which is defined by Equation 1 below, according to the present invention may be 1% or more, preferably, 2% or more, and more preferably, 5% or more.

Dielectric constant reduction rate (%)=$[(a-b)/a]*100$ [Equation 1]

In Equation 1 above, a represents the dielectric constant of the base resin, and b represents the dielectric constant of the insulation composition.

An electric field distortion factor (%) of the insulation composition, which is defined by Equation 2 below, according to the present invention may be less than 150%, and preferably, 120% or less.

Electric field distortion factor (%)=$\alpha/\beta$ [Equation 2]

In Equation 2 above, α represents an electric field (kV/mm) applied to an insulation layer sample formed of the insulation composition, and β represents an electric field (kV/mm) distorted due to a distribution of space charges in the insulation composition.

The electric field (kV/mm) distorted due to the distribution of space charges may be calculated by, for example, integrating a space charge distribution measured by a pulsed electro-acoustic method using a space charge distribution measuring device.

The inorganic nanoparticles may have, for example, a terrace shape, a cubic shape, a rod shape, an edge-less shape, or the like, and preferably has the cubic shape in terms of interface stabilization of the inside of the base resin.

Generally, since the base resin is hydrophobic and surfaces of be inorganic nanoparticles are hydrophilic, the surfaces of the inorganic nanoparticles may be modified to be hydrophobic so as to uniformed disperse the inorganic nanoparticles in the base resin hydrophobic surface treatment may be performed by, example, coating the organic nanoparticles with fatty acid or a silane-based surface treatment agent.

A content of the inorganic nanoparticles may be about 0.01% by weight or more and less than 1% by weight, based on a total weight of the insulation composition. In detail, the content of the inorganic nanoparticles may be about 0.01% by weight or more and less than 1% by weight when the inorganic nanoparticles are metal or non-metal oxide or when the inorganic nanoparticles are carbon-based nanoparticles.

An effect of reducing a space charge and a dielectric constant of the insulation composition is insignificant when the content of the inorganic nanoparticles is below the above standard, and the effect of reducing the dielectric constant of the insulation composition is not obtained when the content of the inorganic nanoparticles exceeds the above standard.

The insulation composition according to the present invention may further include other additives, such as a crosslinking agent, an antioxidant, a scorch inhibitor, etc., as well as the inorganic nanoparticles. The crosslinking agent may vary according to a crosslinking mode of the insulation composition, and may include, for example, organic peroxides, such as dicumyl peroxide, for chemical crosslinking. A content of the crosslinking agent may be 0.5 to 2% by weight, based on the total weight. of the insulation composition.

When the content of the crosslinking agent is less than 0.5% by weight, the mechanical properties, heat resistance, etc. of the insulation layer formed of the insulation composition may be insufficient. When the content of the crosslinking agent is greater than 2% by weight, a crosslinking degree is excessively high and thus scorching may occur due to early crosslinking.

The antioxidant may suppress deterioration of the insulation layer, which is formed of the insulation composition, due to oxidization thereof, and may include, for example, an antioxidant such as a phenol-based antioxidant, a quinone-based antioxidant, or an amine-based antioxidant. A content of the antioxidant may be 0.1 to 1% by weight, based on the total weight of the insulation composition.

The scorch inhibitor may additionally secure crosslinking properties and suppress scorching due to long time extrusion when the insulation composition is cross-linked, and may be, for example, α-methylstyrene dimer (AMSD) or the like. A content of the scorch inhibitor may be 0.1 to 1% by weight, based on the total weight of the insulation composition.

Figure 2:
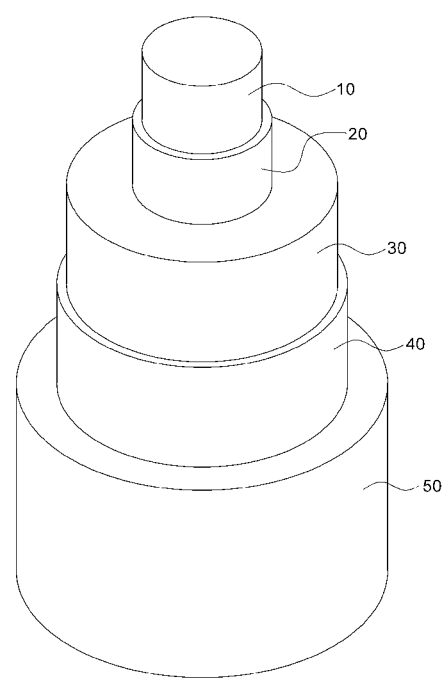
FIG. 2 is a diagram schematically illustrating a structure of a longitudinal section of the cable according to the present invention.

The present invention relates to a cable including an insulation layer formed of the insulation composition. FIGS. 1 and 2 schematically illustrate the structures of a cross section and a longitudinal section of the cable, respectively.

As illustrated in FIGS. 1 and 2, the cable according to the present invention may include a conductor 10 formed of a conductive material such as copper or aluminum and providing a current flow path; an inner semiconducting layer 20 covering the conductor 10, reducing an electric field formed by current flowing through the conductor 10, and improving interfacial adhesion between the conductor 10 and an insulation layer 30 which will be described below; the insulation layer 30 covering the inner semiconducting layer 20 and formed of the insulation composition according to the present invention; an outer semiconducting layer 40 covering the insulation layer 30 and uniformizing an electric field applied to the insulation layer 30; a sheath layer 50 protecting the cable from external impacts or pressure; and so on.

EXAMPLES

1. Preparation Examples

Insulating compositions according to examples and comparative examples were prepared with materials having contents as shown in Table 1 below and then tubular insulation layer samples having a diameter of 3 cm and a thickness of 0.5 mm were formed thereof. The contents of the materials shown in Table 1 below are expressed in wt %.

TABLE 1

|  | Comparative example 1 | Comparative example 2 | Example 1 | Example 2 |
|---|---|---|---|---|
| Base resin | 100 | 99 | 99.5 | 99.8 |
| Inorganic nanoparticles | 0 | 1 | 0.5 | 0.2 | base resin: low-density polyethylene (LDPE)
inorganic nanoparticles: magnesium oxide (MgO)

2. Evaluation of Physical Properties

1) Measurement of Dielectric Constant

Figure 3:
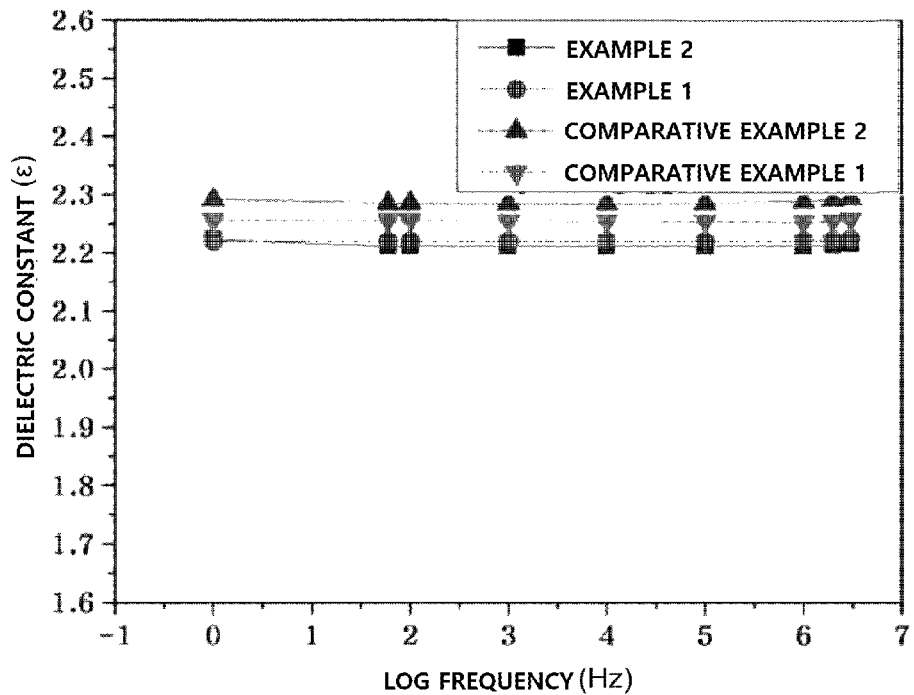
FIG. 3 is a graph showing a result of measuring a dielectric constant of a sample of an insulation layer, which was formed of an insulation composition according to the present invention, per frequency.
Figure 4:
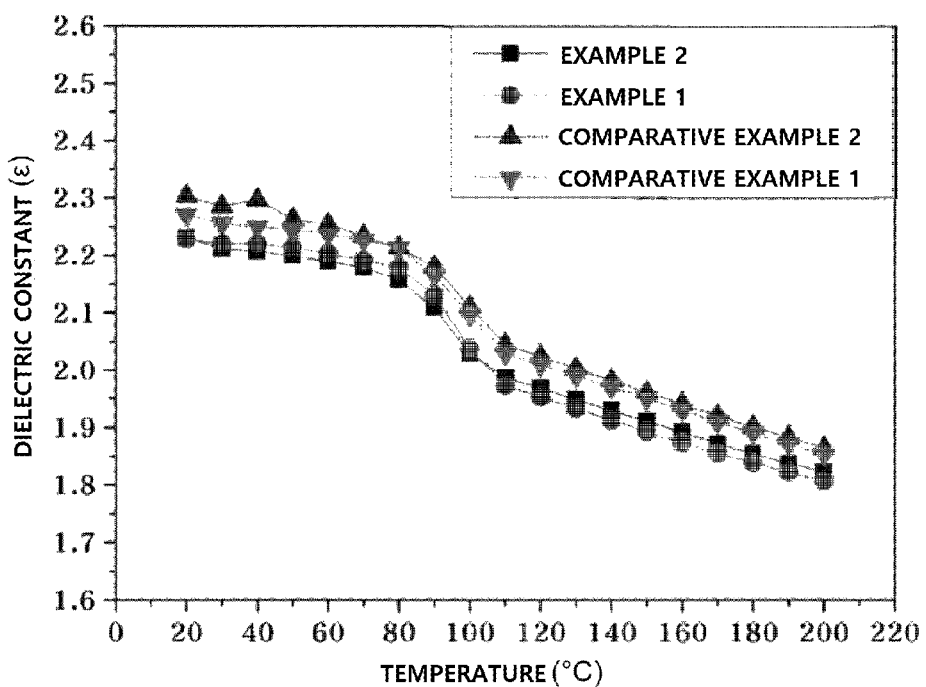
FIG. 4 is a graph showing a result of measuring a dielectric constant of a sample of an insulation layer, which was formed of an insulating composition according to the present invention, per temperature.

Dielectric constants of the insulation layer samples of the examples and the comparative examples were measured versus frequency per minute according to the standard ASTM D150 by a dielectric constant measuring device (manufacturer: Novocontrol Technology; product name: Broadband Dielectric Spectroscopy), and were measured versus temperature at a heating rate of 1 to 20° C./min. A result of measuring the dielectric constants is as shown in FIGS. 3 and 4.

2) Measurement of Impulse Dielectric Breakdown Voltage

A voltage of 50 Kv was applied ten times to each of the insulation layer samples of the examples and the comparative examples and breakdown voltages were recorded as impulse dielectric breakdown voltages by an impulse dielectric breakdown voltage measuring device (manufacturer: Haefely Hipotronics). A result of measuring the impulse dielectric breakdown voltages is as shown in Table 2 below.

3) Evaluation of Electric Field Distortion

An electric field of 50 kV/mm was applied to the insulation layer samples of the examples and the comparative examples by the pulse electro-acoustic method using a space charge distribution measuring device, a distorted electric field was calculated by measuring and integrating a space charge distribution, and an electric field distortion factor defined by an equation of ((distorted electric field/50)*100)

was calculated. A result of evaluating electric field distortion is as shown in Table 2 below.

TABLE 2

|  | Comparative example 1 | Comparative example 2 | Example 1 | Example 2 |
|---|---|---|---|---|
| Impulse dielectric breakdown voltage (kV) | 1600↑ | 517 | 1450 | 1600 |
| Electric field distortion (%) | 150%↑ | 105%↓ | 120%↓ | 120%↓ |

As shown in FIGS. 3 and 4 and Table 2 above, each of the insulation compositions of examples 1 and 2 of the present invention had inorganic nanoparticles having a greater dielectric constant than that of the base resin but a dielectric constant thereof was lower than that of the base resin, an impulse dielectric breakdown voltage was high, and an electric field distortion rate was 120% or less and thus an effect of reducing a space charge was high. Thus, a superimposed impulse dielectric breakdown voltage increased.

In contrast, the insulation composition of comparative example 1 had no inorganic nanoparticles and thus an electric field distortion rate was 150% or more and space charges were accumulated therein. Accordingly, a superimposed impulse dielectric breakdown voltage was low. The amount of the inorganic nanoparticles added to the insulation composition of comparative example 2 exceeded a reference level and thus a dielectric constant was increased and an impulse dielectric breakdown voltage was significantly reduced.

Various modifications and changes may be made in the present invention by those of ordinary skill in the art without departing from the idea and scope of the present invention defined in the following claims. Thus, it is clear that all modifications are included in the technical scope of the present invention as long as they include the components as claimed in the claims of the present invention.

The invention claimed is:

1. An insulation composition comprising:
a base resin; and
a metal or non-metal oxide having a size of 1 to 100 nm included in the base resin,
wherein the metal or the non-metal oxide comprises at least one selected from the group consisting of magnesium oxide (MgO), zinc oxide (ZnO), silicon oxide (SiO2), aluminum oxide (Al2O3) and titanium oxide (TiO2), and a content of the metal or non-metal oxide is 0.01% by weight or more and less than 1% by weight, based on a total weight of the insulation composition,
wherein a dielectric constant of the insulation composition is less than that of the base resin,
wherein a dielectric constant reduction rate (%) defined by Equation 1 below is 1% or more, dielectric constant reduction (%)=[($a$−$b$)/$a$]*100, [Equation 1]

wherein $a$ represents the dielectric constant of the base resin, and $b$ represents the dielectric constant of the insulation composition.

2. The insulation composition of claim 1, wherein the dielectric constant reduction rate (%) is 2% or more.

3. The insulation composition of claim 1, wherein an electric field distortion factor (%) defined by Equation 2 below is less than 150%, electric field distortion factor (%)=$\alpha$/$\beta$, [Equation 2]

wherein $\alpha$ represents an electric field (kV/mm) applied to an insulation layer sample formed of the insulation composition, and $\beta$ represents an electric field (kV/mm) distorted due to a distribution of space charges in the insulation composition.

4. The insulation composition of claim 3, wherein the electric field distortion factor (%) is 120% or less.

5. The insulation composition of claim 1, wherein the metal or the non-metal oxide has a cubic shape.

6. The insulation composition of claim 1, wherein the metal or the non-metal oxide is surface modified to be hydrophobic.

7. The insulation composition of claim 1, wherein the base resin is an olefin homopolymer or copolymer resin.

8. The insulation composition of claim 1, further comprising 0.5 to 2% by weight of a crosslinking agent, 0.1 to 1% by weight of an antioxidant, and 0.1 to 1% by weight of a scorch inhibitor, based on a total weight of the insulating composition.

9. A cable comprising:
a conductor;
an inner semiconducting layer covering the conductor;
an insulation layer covering the inner semiconducting layer, and formed of the insulation composition of claim 1;
an outer semiconducting layer covering the insulation layer; and
a sheath layer covering the outer semiconducting layer.

* * * * *